United States Patent
Dupoiron et al.

(10) Patent No.: US 6,415,825 B1
(45) Date of Patent: Jul. 9, 2002

(54) FLEXIBLE CONDUIT WITH HIGH INERTIA HOOP

(75) Inventors: François Dupoiron, Barentin; Philippe François Espinasse, Bihorel; Patrice Jung, La Mailleraye-sur-Seine; Bernard Jacques Houot, Bouville, all of (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/806,891

(22) PCT Filed: Sep. 6, 1999

(86) PCT No.: PCT/FR99/02116
§ 371 (c)(1),
(2), (4) Date: Apr. 5, 2001

(87) PCT Pub. No.: WO00/22337
PCT Pub. Date: Apr. 20, 2000

(30) Foreign Application Priority Data

Oct. 12, 1998 (FR) .............................................. 98 12746

(51) Int. Cl.[7] .............................................. F16L 11/10
(52) U.S. Cl. ........................ 138/127; 138/130; 138/131; 138/135; 138/144; 428/35.8; 428/36.91
(58) Field of Search ................... 138/135, 127, 138/130, 131, 144; 428/35.8, 36.91

(56) References Cited

U.S. PATENT DOCUMENTS

| 4,403,631 | A | * | 9/1983 | Abdullaev et al. | ........... 138/130 |
| 4,549,581 | A | * | 10/1985 | Unno et al. | ................. 138/130 |
| 4,903,735 | A | | 2/1990 | Delacour | .................... 138/133 |
| 5,275,209 | A | | 1/1994 | Sugier et al. | ................ 138/135 |
| 5,730,188 | A | | 3/1998 | Kalman | ....................... 138/135 |
| 6,039,083 | A | * | 3/2000 | Loper | ........................ 138/135 |
| 6,085,798 | A | * | 8/2000 | Le Nouveau | ............... 138/130 |
| 6,098,667 | A | * | 8/2000 | Oldry et al. | ................. 138/131 |
| 6,110,550 | A | * | 8/2000 | Jarrin et al. | ................. 138/134 |
| 6,123,114 | A | * | 9/2000 | Sequina | ....................... 138/130 |
| 6,192,941 | B1 | * | 2/2001 | Mallen-Herrero et al. | .. 138/135 |

FOREIGN PATENT DOCUMENTS

| FR | 2590646 | 5/1987 |
| FR | 2744511 | 8/1997 |
| FR | 2782141 | 2/2000 |
| GB | 2156031 | 10/1985 |
| WO | 9618060 | 6/1996 |

OTHER PUBLICATIONS

"Specification for Unbonded Flexible Pipe", API Specification 17J, First Edition, Dec. 1996.

* cited by examiner

*Primary Examiner*—James Hook
(74) *Attorney, Agent, or Firm*—Ostrolenk, Faber, Gerb & Soffen, LLP

(57) ABSTRACT

The invention concerns a flexible tubular pipe comprising, from inside outwards, a web (1) made of interlocked steel strips, an inner impervious sheath (2) in polymer material, a short-stepped helical winding of interlocked forming wire (3) arranged above the internal sheath (2), at least a hoop (4) consisting of a short-stepped metal wire winding without interlock, at least a long-stepped tractive armouring layer (5) wound around the pressure vault and an outer polymer protective and sealing sheath (8); the sickness (Ef) of the hoop (4) is greater than the thickness (Ez) of the metal forming wire (3), preferably by one to three times.

7 Claims, 2 Drawing Sheets

FIG_1
PRIOR ART

FLEXIBLE CONDUIT WITH HIGH INERTIA HOOP

The present invention relates to a flexible pipe for transporting, over long distances, a fluid which is under pressure and possibly at a high temperature, such as a gas, petroleum, water or other fluids. The invention relates most particularly to a pipe intended for offshore oil exploration. It relates especially, first, to flow lines, that is to say flexible pipes unwound from a barge in order to be laid generally on the bottom of the sea and connected to the subsea installations, such pipes working mainly in static mode, and, secondly, to risers, that is to say flexible pipes which are unwound from a surface installation such as a platform and are connected to the subsea installations and most of which do not lie below the seabed, such pipes working essentially in dynamic mode.

The flexible pipes used offshore must be able to resist high internal pressures and/or external pressures and also withstand longitudinal bending or twisting without the risk of being ruptured.

They have various configurations depending on their precise use but in general they satisfy the constructional criteria defined in particular in the standards API 17 B and API 17 J drawn up by the American Petroleum Institute under the title "Recommended Practice for Flexible Pipe".

For pipes intended for greater depths, in which the risk of collapse of the pipe due to the external pressure is greater, a configuration known as a "rough bore" configuration is used. In general, such pipes comprise, from the inside outward:

- a carcass consisting of an interlocked metal strip, which serves to prevent collapse under pressure;
- an internal sealing sheath made of a plastic, generally a polymer, able to resist to a greater or lesser extent the chemical action of the fluid to be transported;
- a pressure vault resistant to the external pressure, but mainly to the pressure which is developed by the fluid (internal pressure) in the sealing sheath and which results in hoop stresses in the pressure vault; the pressure vault generally comprises a winding of one or more interlocked profiled metal wires (which may or may not be self-interlockable) wound in a helix with a short pitch (that is to say with a wind angle with respect to the pipe axis of between 75° and almost 90°) around the internal sheath; these profiled wires typically have T-, U- or Z-shaped cross sections, and variants thereof, these being known as "teta" and "zeta";
- at least one ply (and generally at least two crossed plies) of tensile armor layers whose lay angle measured along the longitudinal axis of the pipe is less than 55°; and
- an external protective sealing sheath made of a polymer.

When the pipe is intended to convey a fluid under high pressure, the pipe has to be reinforced by increasing the size of the profiled wire used for producing the pressure vault. However, the wire of the pressure vault is wound with non-touching turns in order to give the pipe a degree of flexibility. The expression "non-touching turns" is understood to mean turns between which a certain space or interstice, called hereinafter "gap", is left, which gap may be greater the larger the wound profiled wire.

Due to the effect of the internal pressure and/or of the temperature developed by the fluid, the internal sealing sheath, which is relatively soft, is pressed against the internal face of the pressure vault and has a tendency to penetrate one or more inter-turn gaps. The penetration or creep tendency of the sealing sheath increases with the duration and/or the severity of the operating conditions of the flexible pipe, for example when the fluid to be conveyed flows under a high pressure (several hundred bar) and/or at a high temperature (greater than 100° C.), a high temperature generally reducing the rigidity of the internal sealing sheath. When the sealing sheath gradually penetrates the gaps, either cracks are produced, which thus affect the sealing function of the internal sheath, or even one or more local fractures of the internal sheath occur, the consequence of such incidents being an intrusion of the fluid to the outside of the internal sheath, which no longer fulfills the required sealing.

Several solutions have been proposed for limiting or trying to prevent the creep of the internal sheath into the gaps between the turns of the pressure vault, such as the choice of a thicker and/or stronger material for the sheath, but this generally results in an increase in the manufacturing cost of the pipe and often complicates its manufacture. A very advantageous solution has been proposed in document FR 2 744 511 A, which consists in winding an anti-creep tape having specific characteristics around the sealing sheath, this tape forming a sublayer lying beneath the internal face of the pressure vault, but the effectiveness of this solution encounters limitations at high pressures and for high flexible pipe diameters.

Another solution has been developed by the Applicant specifically for pipes used under extreme conditions (that is to say for great depths and/or a high internal pressure and/or large pipe diameters) and forms the subject matter of patent application FR 98/10254. According to that solution, the vault includes an elongate overlay element at least partially masking the gaps of the profiled wire facing the internal sheath. The elongate, preferably flat, overlay element is advantageously placed helically in and to the rear of the internal face of the pressure vault so as not to be projecting with respect to the annular volume of the vault; the overlay element may be especially produced by an attached wire which is inserted into the internal face of the vault or by parts of the profiled wire itself by an overlap on the internal face of the vault.

Moreover, in order to increase the resistance to the internal pressure of the pressure vault, it is known, for example from the aforementioned standard API 17J, to provide, as an accessory, what is called a hoop layer consisting of a winding of a flat rectangular wire also with a short pitch, which is superposed on the profiled wire, thus constituting the first layer of the pressure vault, this new, double winding being, of course, without any interlocking. Document EP 0 796 404 A in the name of the Applicant shows a hoop on top of a winding of interlocked "teta" wire and documents US 4 903 735 A, 5 275 209 A and US 5 730 188 A show a hoop on top of a self-interlockable "zeta" winding.

To the knowledge of the Applicant, the hoop is always a flat wire with a relatively small thickness (generally less than 7.5 mm) and always less than the thickness of the profiled wire forming the first layer of the pressure vault which principally fulfills the function of pressure resistance. Such a thickness is sufficient for the hoop to act as an accessory to the profiled wire which is given to it in the resistance to the internal pressure.

Finally, it is known that the carcass can deform, when a large load is applied to it, in two main modes, namely the cardioid mode and the more unfavorable ovalized mode. When the pipe has to be used at great depths, it is known that, to prevent the carcass from ovalizing too rapidly, it is necessary for the pressure vault to be designed accordingly.

Although such a typical strong pipe, with its interlocked carcass, its sealing sheath and its pressure vault with the interlocked profiled wire and the hoop, is satisfactory from the technical standpoint, it is relatively expensive, and this cost increases even more when they are pipes for extreme conditions: the profiled wire of complex cross section is even more expensive the larger and heavier it is, both in terms of raw materials and processing; in addition, the gaps whose size matches that of the profiled wire require measures to be taken in order to prevent the sealing sheath from creeping, such as, for example, increasing the thickness of the sheath.

The object of the invention is to propose a flexible pipe having substantially the same technical performance in terms of creep resistance, service pressure and collapse pressure, especially when it is used under extreme conditions, but whose construction is modified in order to achieve a lower manufacturing cost.

The object of the invention is achieved by a flexible tubular pipe comprising at least, from the inside outward, a carcass made of interlocked metal strip, an internal sealing sheath made of a polymer material, a helical winding with a short pitch of an interlocked metal element placed on top of the internal sheath, at least one hoop consisting of a non-interlocked metal wire wound with a short pitch, at least one ply of tensile armor layers wound with a long pitch around the pressure vault and an external protective sealing sheath made of a polymer, characterized in that the thickness of the hoop is greater than the thickness of the metal element. Thus, according to the invention, the pressure vault, denoting here the structure intended to take up the hoop forces induced by the internal pressure, essentially consists of at least one hoop winding, that is to say a winding of non-interlocked wire with a short pitch. The word "essentially" is understood to mean that the function of the hoop is no longer just an accessory, but its main function is to provide resistance to the internal and external pressure, previously fulfilled by the profiled wire, which in practice means that, for a pipe of a given diameter and a given desired strength, a hoop is used which is thicker, and therefore has a higher inertia, than the conventional hoop.

The invention is based on a complete reinterpretation of the functions of the pressure vault. Whereas in a conventional structure the winding of the interlocked profiled wire essentially provides the resistance to the internal pressure with respect to the hoop, in the structure proposed by the invention it is the hoop which fulfills the essential role in providing resistance to the internal pressure. Of the other two functions of the winding of interlocked profiled wire, namely the combined resistance to crushing (or more exactly to ovalization, in conjunction with the carcass) and possibly the creep resistance of the sealing sheath, the first one may also be partially transferred to the hoop, the inertia of which is increased (because of the increase in thickness) compared with that of a conventional hoop, whereas the second one is retained by an interlocked profiled wire which, in this case, has a much smaller cross section than in a conventional pipe for the same application, or is even transferred to a simple interlocked metal strip.

When the interlocked metal element is a profiled wire, especially a wire with a "zeta" cross section, it is advantageous for the thickness of the hoop to be between about 1 and 3 times the thickness of said profiled wire. Although the dimensions of the hoop are to be determined according to the diameter of the pipe, hoop sections having a thickness of 15 mm and more are easily conceivable. The width of the hoop is not critical, but cross sections of 15×25 mm² may be cited as an example. The cross section of the hoop is, moreover, not necessarily rectangular (or square); in general, any profile whose upper and lower faces are plane is suitable. The cross section may, moreover, be reduced, while maintaining the required inertia, by, for example, concavities on its lateral faces or internal recesses.

As mentioned above, said interlocked metal element of the pressure vault may be merely an interlocked metal strip, for example similar to the metal strip of the carcass.

BRIEF DESCRIPTION OF THE DRAWINGS

The invention will be more clearly understood and further advantages and characteristics will be revealed on reading the following description of illustrative examples of the flexible pipe according to the invention. Reference will be made to the appended drawings in which.

Figure 1:
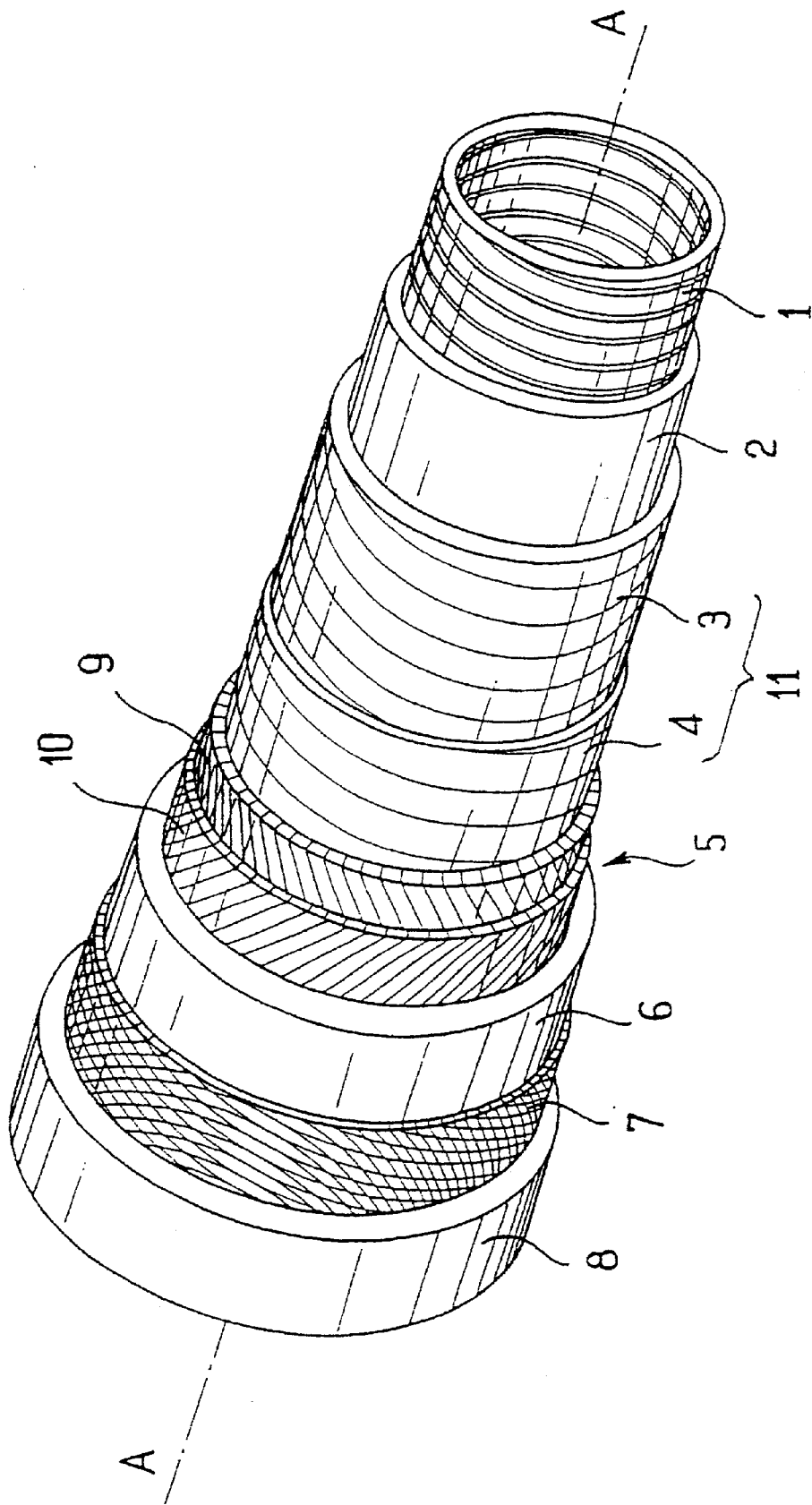
FIG. 1 is a schematic perspective view showing the successive layers of a pipe of the "rough bore" type of the prior art.
Figure 2:
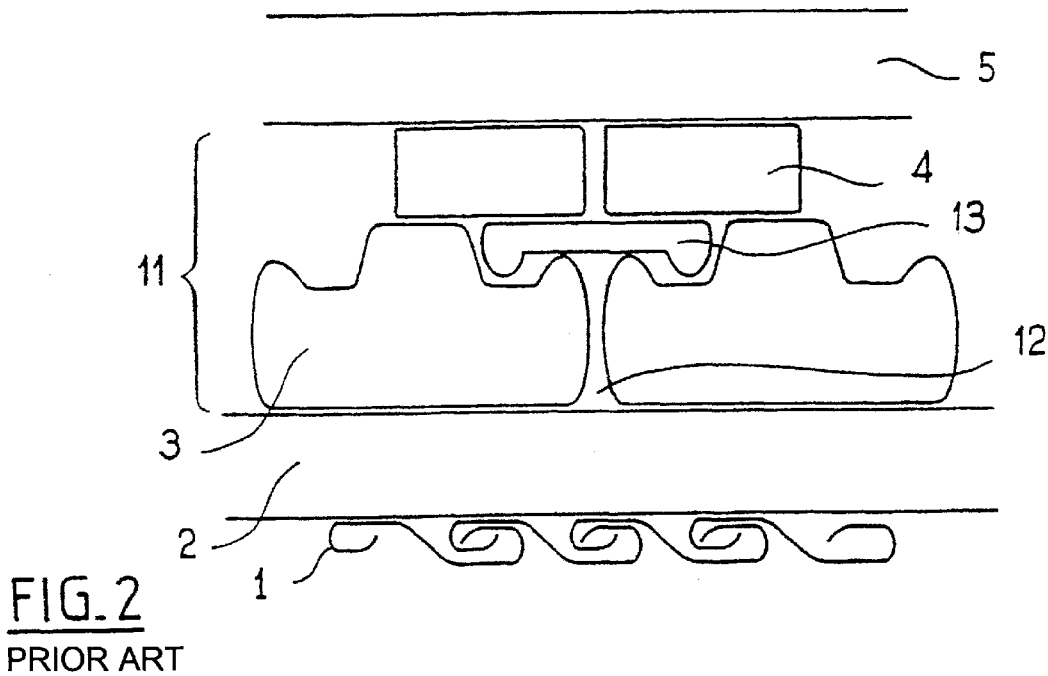
FIG. 2 is a partial view in longitudinal section of the pipe in FIG. 1, showing the detail of the conventional pressure vault with hoop.

As FIGS. 1 and 2 show, a "rough bore"-type pipe comprises, from the inside outward: a metal carcass 1, generally made from an interlocked metal strip and intended to provide resistance to crushing under the external pressure; a polymeric internal sealing sheath 2, a metal pressure vault 11, consisting here conventionally of the winding of an interlocked profiled metal wire 3 wound in a helix with a short pitch (the wind angle is generally about 90° with respect to the pipe axis) together with the winding of a hoop wire 4 wound in a helix with a short pitch, an armor layer 5 resistant to axial tension in the longitudinal direction of the pipe and conventionally consisting of one or more pairs of crossed plies 9, 10 wound with a long pitch (typically less than 55° with respect to the pipe axis) in opposite senses, and a polymeric external sealing sheath 8. Further intermediate layers, such as the layers 6, 7 may be provided depending on the type and use of the pipe.

As shown more particularly in FIG. 2, in the case of a pipe of the prior art intended for great depths, a "teta" wire of large cross section, for example having a thickness of 14 mm, is used for the profiled wire 3 which is interlocked by an interlocking wire 13 having a flat U-shaped cross section, and a flat hoop wire 4 having a thickness of 7.5 mm for example. Given the thickness of the profiled wire 3 and the necessary gaps 12 between consecutive turns, quite a thick sealing sheath 2 is provided in order to resist inter-turn creep.

Figure 3:
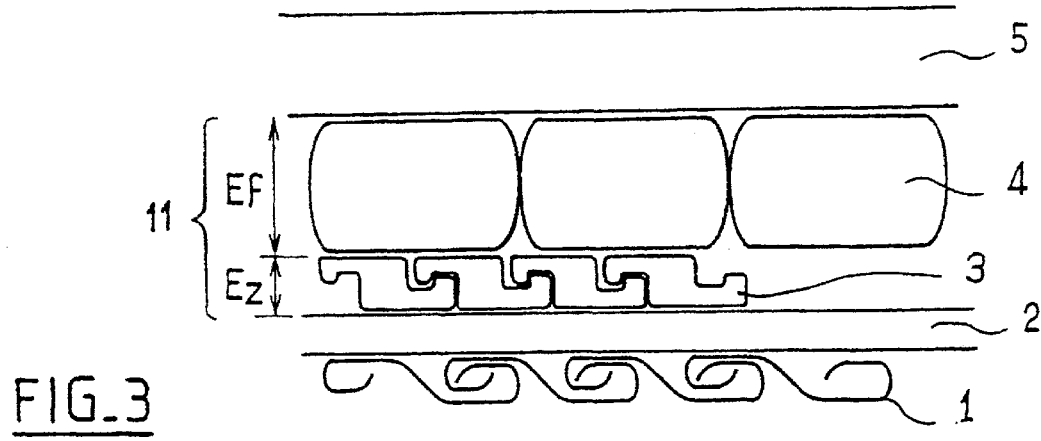
FIG. 3 is a view similar to FIG. 2 of a first embodiment of a flexible pipe according to the invention.

FIG. 3 shows the structure of the pipe according to the invention, intended for the same applications as the pipe in FIG. 2. It is characterized by a pressure vault 11 consisting of a heavy hoop 4 (made from one or more wires, as known per se), for example having a thickness Ef of 13.5 mm, and a profiled wire 3 of small cross section (or several such wires), here for example a self-interlockable "zeta" wire with a thickness Ez of 8 mm. In general, it is advantageous for the Ef/Ez ratio to be between about 1 and 3, instead of being less than 1 as in the prior art. Because it is possible to use according to the invention a "zeta" profiled wire of small cross section, which naturally has smaller gaps than those of the large "teta" wire of FIG. 2, the sealing sheath 2 may have a smaller thickness than that in FIG. 2 since the risk of creep is less.

Given the lower cost of the thinner "zeta" wire compared with the heavy "teta" wire, both in terms of raw material and processing, together with the reduction in thickness of the sealing sheath, and despite a hoop of increased weight, the overall cost of the pipe of the invention is very substantially reduced compared with the technically equivalent pipe of the prior art, by about 20 to 30%.

Advantageously, the thick hoop 4 is wound onto the pipe by means of the spiraling machine described in application FR 97/10584, which allows wires of high inertia to be spiraled.

Figure 4:
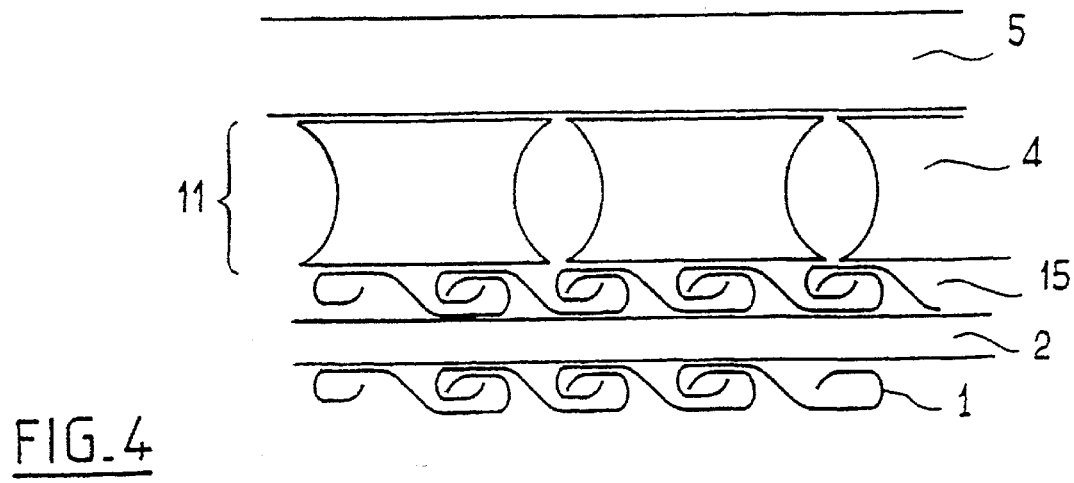
FIG. 4 is a view similar to FIG. 2 of a second embodiment of a flexible pipe according to the invention.

In the embodiment in FIG. 4, the anti-creep function is provided by a layer 15 of interlocked metal strip, which may furthermore provide a certain function in the crush resistance. The hoop 4 has been shown with a cross section reduced by lateral concavities.

What is claimed is:

1. A flexible tubular pipe comprising from inside the pipe outward,
   a carcass of interlocked metal strip wrapped around to define the carcass,
   an internal sealing sheath of a polymer material,
   a pressure vault for resisting internal pressure in the sheath, the pressure vault comprising a helical winding with a short pitch of an interlocked metal element extending around the internal sheath,
   the pressure vault further comprising at least one hoop of a non-interlocked metal wire wound with a short pitch,
   at least one ply of tensile armor layers wound with a long pitch around the pressure vault, and
   an external protective sealing sheath made of a polymer,
   wherein the hoop has a thickness in the radial direction that is greater than the thickness of the interlocked metal element.

2. The pipe as claimed in claim 1, wherein the interlocked metal element is profiled wire.

3. The pipe as claimed in claim 2, characterized in that the profiled wire is a wire with a "zeta" cross section.

4. The pipe as claimed in claim 2, wherein the thickness of the hoop is between about 1 and 3 times the thickness of said profiled wire.

5. The pipe as claimed in claim 4, wherein the profiled wire is a wire 0with a "zeta" cross section.

6. The pipe as claimed in claim 1, wherein said metal element is an interlocked metal strip.

7. A flexible tubular pipe comprising from inside the pipe outward,
   an internal sealing sheath of a polymer material,
   a pressure vault for resisting internal pressure in the sheath, the pressure vault comprising a helical winding with a short pitch of an interlocked metal element extending around the internal sheath,
   the pressure vault further comprising at least one hoop of a non-interlocked metal wire wound with a short pitch,
   at least one layer outward of the vault,
   wherein the hoop has a thickness in the radial direction that is greater than the thickness of the interlocked metal element.

* * * * *